United States Patent
Koike et al.

(10) Patent No.: US 9,884,377 B2
(45) Date of Patent: Feb. 6, 2018

(54) CUTTING INSERT AND MILLING CUTTER

(71) Applicant: SUMITOMO ELECTRIC HARDMETAL CORP., Itami-shi (JP)

(72) Inventors: Yusuke Koike, Itami (JP); Kouki Matsubara, Itami (JP); Katsuya Nakakihara, Itami (JP); Atsuhiko Maeta, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 258 days.

(21) Appl. No.: 14/902,445

(22) PCT Filed: Apr. 16, 2015

(86) PCT No.: PCT/JP2015/061681
§ 371 (c)(1),
(2) Date: Dec. 31, 2015

(87) PCT Pub. No.: WO2015/174200
PCT Pub. Date: Nov. 19, 2015

(65) Prior Publication Data
US 2016/0375506 A1    Dec. 29, 2016

(30) Foreign Application Priority Data

Jun. 2, 2014  (JP) ................. 2014-113972

(51) Int. Cl.
*B23C 5/20* (2006.01)
*B23C 5/06* (2006.01)
*B23C 5/22* (2006.01)

(52) U.S. Cl.
CPC ............. *B23C 5/207* (2013.01); *B23C 5/06* (2013.01); *B23C 5/2221* (2013.01);
(Continued)

(58) Field of Classification Search
CPC . B23C 5/207; B23C 5/2221; B23C 2210/205; B23C 2200/0405;
(Continued)

(56) References Cited

U.S. PATENT DOCUMENTS

| 6,079,912 | A | * | 6/2000 | Rothballer | ............ | B23C 5/2213 |
|  |  |  |  |  |  | 407/114 |
| 9,022,700 | B2 | * | 5/2015 | Bhagath | ................ | B23B 27/007 |
|  |  |  |  |  |  | 407/113 |

(Continued)

FOREIGN PATENT DOCUMENTS

| CN | 101668604 A | 3/2010 |
| CN | 102528143 A | 7/2012 |

(Continued)

OTHER PUBLICATIONS

International Search Report in PCT International Patent Application No. PCT/JP2015/061681, dated Jul. 7, 2015.

(Continued)

*Primary Examiner* — Will Fridie, Jr.
(74) *Attorney, Agent, or Firm* — Venable LLP; Michael A. Sartori; Miguel A. Lopez

(57) ABSTRACT

A cutting insert includes a first surface and a second surface each of which is polygonal and that face away from each other; a side surface that is continuous with the first surface and a side surface that is continuous with the second surface; a cutting edge formed along each of a ridge where the first surface and the side surface intersect and a ridge where the second surface and the side surface intersect; a bearing surface formed in each of a part the first surface and a part of the second surface adjacent to an insert center, the bearing surfaces disposed parallel to each other; and a recessed portion that separates the side surface that is continuous with the first surface from the side surface that is continuous with the second surface. The cutting edge includes three corner (Continued)

edges, a first cutting edge, and a second cutting edge, the first and second cutting edges being continuous with each other and located between each pair of the corner edges. A length of the first cutting edge is greater than that of the second cutting edge, an end portion of the first cutting edge adjacent to one of the corner edges is at a position higher than the bearing surface, and an end portion of the first cutting edge opposite to the end portion adjacent to the corner edge is at a position lower than the bearing surface. Each of the first surface, the second surface, and a cross section of the recessed portion has such a shape that outlines of the shape before and after rotation of the insert by 120° around the insert center are coincident with each other. The first surface and the second surface have the same shape, and the second cutting edge of the second surface is located at a corner at which the first cutting edge of the first surface is located.

4 Claims, 6 Drawing Sheets

(52) U.S. Cl.
CPC . *B23C 2200/0411* (2013.01); *B23C 2200/126* (2013.01); *B23C 2210/168* (2013.01)

(58) Field of Classification Search
CPC ......... B23C 2200/0411; B23C 2200/12; B23C 2200/123; B23C 2200/125; B23C 2200/126; B23C 2200/128
See application file for complete search history.

(56) References Cited

U.S. PATENT DOCUMENTS

| | | | | |
|---|---|---|---|---|
| D744,557 S | * | 12/2015 | Koike | B23C 5/00 D15/139 |
| 9,370,832 B2 | * | 6/2016 | Kurokawa | B23C 5/08 |
| 9,475,133 B2 | * | 10/2016 | Koga | B23C 5/06 |
| 9,770,767 B2 | * | 9/2017 | Shibata | B23C 5/06 |
| 2007/0071559 A1 | * | 3/2007 | Koskinen | B23B 27/16 407/34 |
| 2013/0294850 A1 | * | 11/2013 | Park | B23C 5/06 407/47 |
| 2014/0010605 A1 | * | 1/2014 | Smilovici | B23C 5/06 407/42 |
| 2014/0334890 A1 | * | 11/2014 | Takahashi | B23C 5/109 407/114 |
| 2015/0190867 A1 | * | 7/2015 | Roman | B23C 5/06 407/42 |

FOREIGN PATENT DOCUMENTS

| | | |
|---|---|---|
| CN | 103128350 A | 6/2013 |
| CN | 103313814 A | 9/2013 |
| CN | 103764327 A | 4/2014 |
| JP | 2003-275920 A | 9/2003 |
| JP | 2009-226577 A | 10/2009 |
| JP | 2010-523352 A | 7/2010 |
| JP | 2010-524709 A | 7/2010 |
| JP | 2013-107198 A | 6/2013 |
| KR | 101105934 B1 | 1/2012 |
| WO | WO-2013/002341 A1 | 1/2013 |
| WO | WO-2013/125542 A1 | 8/2013 |
| WO | WO-2014/081011 A1 | 5/2014 |

OTHER PUBLICATIONS

Notification of Reasons for Rejection in Japanese Patent Application No. 2014-113972, dated Jun. 30, 2015.
Notification of the First Office Action in counterpart Chinese Patent Application No. 201580001149.4, dated Sep. 6, 2016.

* cited by examiner

CUTTING INSERT AND MILLING CUTTER

TECHNICAL FIELD

The present invention relates to a polygonal reversible cutting insert and a milling cutter including the cutting insert.

BACKGROUND ART

PTL 1 discloses a known example of such a cutting insert.

The cutting insert disclosed in PTL 1 is hexagonal and has acute angle corners and obtuse angle corners that are alternately arranged.

The corner angles of the three acute angle corners are the same, and the corner angles of the three obtuse angle corners are the same.

The cutting insert has such a shape that the projected shape of an upper surface is extended to a lower surface, and a ridge where the upper surface and a side surface intersect and a ridge where the lower surface and the side surface intersect serve as cutting edges.

As illustrated in FIG. 13, with such a shape, all cutting edges of the upper and lower surfaces have the same length L.

The sharpness of a reversible negative cutting insert in which a side surface perpendicularly intersects upper and lower surfaces, such as the cutting insert described in PTL 1, is low. Therefore, as illustrated in FIG. 14, the sharpness is increased by making a major cutting edge be inclined by about θ=5° to 30° with respect to a flat bearing surface (perpendicular to the side surface) that is to be received and supported by an insert support seat of a tool body (and by increasing the axial rake of a cutter by using the inclination).

CITATION LIST

Patent Literature

[PTL 1] Japanese Unexamined Patent Application Publication No. 2003-275920

SUMMARY OF INVENTION

Technical Problem

With existing hexagonal reversible cutting inserts, such as the one described above, a major cutting edge length of a face milling cutter is short, and it is difficult to respond to a demand for extending a cutting region of the major cutting edge.

Moreover, because the major cutting edge is inclined by making an edge corner protrude in the insert thickness direction, the height H1 (see FIG. 14) from the bearing surface to the peak of the edge corner is large. Therefore, there is also a problem in that the edge corner chips easily.

An object of the present invention is to increase the strength of an edge corner while making a major cutting edge length be larger than that of an existing reversible cutting insert that has three usable corners on one side and that has the same inscribed circle diameter.

Solution to Problem

To solve the problems described above, a cutting insert according to the present invention has the following structure.

That is, the cutting insert includes a first surface and a second surface each of which is polygonal and that face away from each other; a side surface that is continuous with the first surface and a side surface that is continuous with the second surface; a cutting edge formed along each of a ridge where the first surface and the side surface intersect and a ridge where the second surface and the side surface intersect; a bearing surface formed in each of a part the first surface and a part of the second surface adjacent to an insert center, the bearing surfaces disposed parallel to each other; and a recessed portion that separates the side surface that is continuous with the first surface from the side surface that is continuous with the second surface.

The cutting edge includes three corner edges, a first cutting edge, and a second cutting edge, the first and second cutting edges being continuous with each other and located between each pair of the corner edges.

A length of the first cutting edge is greater than that of the second cutting edge, an end portion of the first cutting edge adjacent to one of the corner edges is at a position higher than the bearing surface, and an end portion of the first cutting edge opposite to the end portion adjacent to the corner edge is at a position lower than the bearing surface.

Each of the first surface, the second surface, and a cross section of the recessed portion has such a shape that outlines of the shape before and after rotation of the insert by 120° around the insert center are coincident with each other.

The first surface and the second surface have the same shape, and the second cutting edge of the second surface is located at a corner at which the first cutting edge of the first surface is located.

The present invention also provides a milling cutter using the cutting insert, specifically, a milling cutter including the cutting insert; and a tool body including an insert support seat that is in contact with the cutting insert. The insert support seat has a major seat surface with which the bearing surface of the cutting insert is in contact and a seat side surface that is in contact with a bottom surface of the recessed portion of the cutting insert.

Advantageous Effects of Invention

With the cutting insert according to present invention, it is possible to provide a long major cutting edge length, as compared with an existing cutting insert having the same inscribed circle diameter.

Moreover, it is possible to increase the strength of an edge corner by decreasing the protruding amount of the edge corner from the bearing surface.

Furthermore, the shape of the side surface that is continuous with the second surface and the shape of the side surface that is continuous with the first surface do not become complex.

With the milling cutter according to the present invention including the cutting insert, it is possible to provide a major cutting edge length that is equivalent to that of an existing cutting insert while reducing the size of the cutting insert, and it is also possible to increase the cramping precision the clamping stability of the cutting insert.

DESCRIPTION OF EMBODIMENTS

Figure 1:
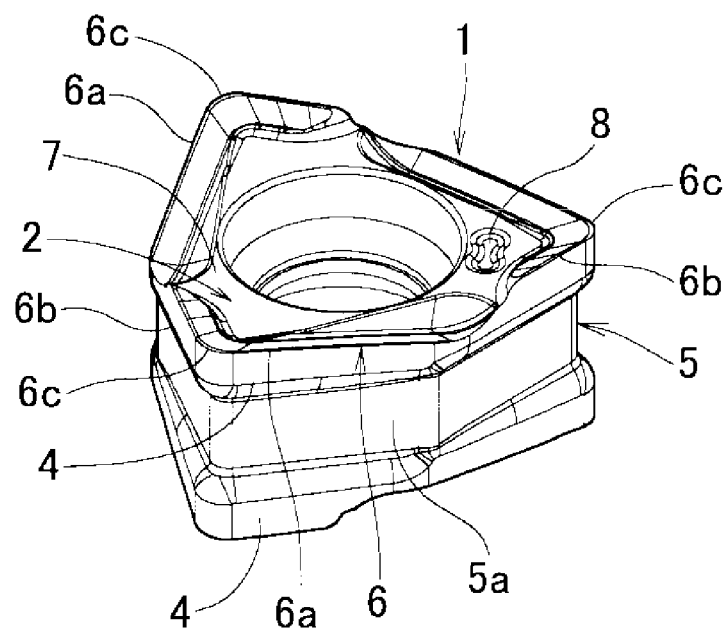
FIG. 1 is a perspective view illustrating an example of a cutting insert according to the present invention.

Hereinafter, a cutting insert and a milling cutter, including the cutting insert, according to the present invention will be described with reference to FIGS. 1 to 12.

As illustrated in FIGS. 1 to 4, a cutting insert 1 has a first surface 2 and a second surface 3, each of which is hexagonal and has acute angle corners and obtuse angle corners that are alternately arranged. The first surface 2 and the second surface 3, which face away from each other, are used as rake faces.

A side surface 4 is continuous with the first surface 2 and a side surface 4 is continuous with the second surface 3. The side surfaces 4, each of which is continuous with a corresponding one of the first surface 2 and the second surface 3, are separated from each other with a recessed portion 5 formed therebetween.

The recessed portion 5 has a bottom surface 5a including six flat surfaces that are arranged so as to be continuous with each other at an angle. The cross sectional shape of the bottom surface 5a, along a plane that is perpendicular to an axis extending along a line perpendicular to the thickness direction of the cutting insert, is a hexagonal shape with six sides having the same length and corners at which acute angles and obtuse angles are alternately arranged.

Ridges where the first surface 2 and the side surface 4 intersect and ridges where the second surface 3 and the side surface 4 intersect each serve as a cutting edge 6.

The cutting edge 6 includes a first cutting edge 6a, a second cutting edge 6b, and a corner edge 6c having a nose R.

The corner edge 6c is disposed at each of the three acute angle corners. The first cutting edge 6a and the second cutting edge 6b are disposed between each pair of the corner edges.

Figure 2:
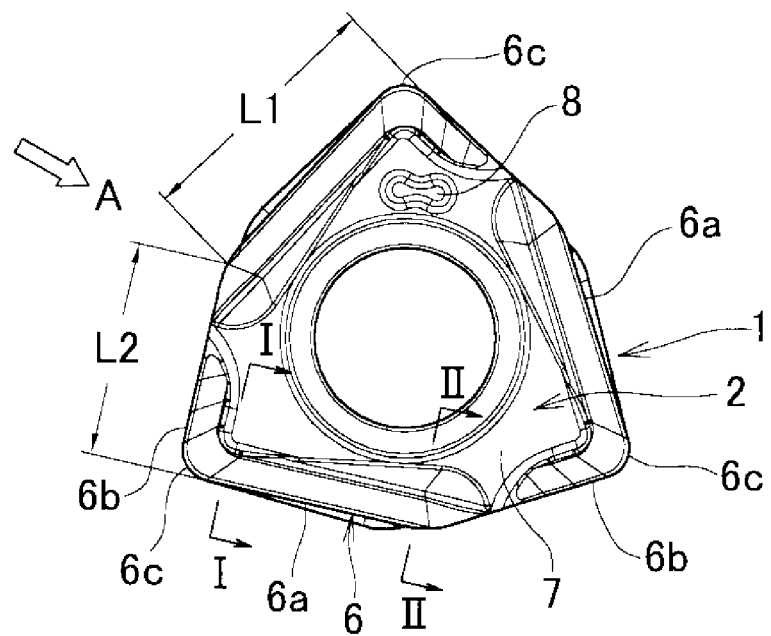
FIG. 2 is a plan view of the cutting insert of FIG. 1.
Figure 3:
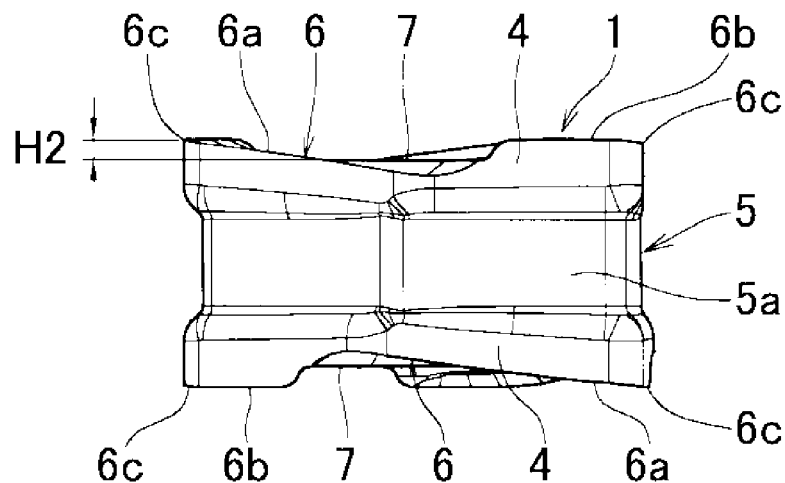
FIG. 3 is a side view of the cutting insert of FIG. 1, viewed in the direction of arrow A of FIG. 2.

As illustrated in FIG. 2, the length L1 of the first cutting edge 6a including a corner edge is greater than the length L2 of the second cutting edge 6b. The first cutting edge 6a extends from one end of each corner edge 6c to an obtuse angle corner at a larger distance from the one end. The second cutting edge 6b extends from the other end of each corner edge 6c to an obtuse angle corner at a smaller distance from the other end.

Bearing surfaces 7, which are flat and which extend parallel to each other, are formed in parts of the first surface 2 and the second surface 3 adjacent to the insert center.

The first cutting edge 6a is inclined in such a direction that the position of an edge corner becomes higher (direction in which a part of the first cutting edge 6a adjacent to the corner edge 6c becomes separated from the bearing surface 7). An end portion of the first cutting edge 6a opposite to the corner edge 6c (the end of the first cutting edge adjacent to an obtuse angle corner) is located at a position lower than the bearing surface 7 (closer to the recessed portion 5).

Figure 14:
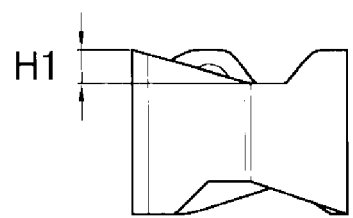
FIG. 14 is side view illustrating an example of an existing reversible hexagonal cutting insert in which a part thereof that serves as a major cutting edge is inclined.

Therefore, when the height between one end and the other end of the first cutting edge 6a in the insert thickness direction is made the same as H1 in FIG. 14, the protruding amount H2 of the edge corner from the bearing surface 7 (see FIG. 3) is less than that of a cutting insert having an existing shape. Therefore, edge strength is increased, and edge chipping does not easily occur.

Each of the first surface 2, the second surface 3, the bottom surface 5a of the recessed portion, and the cutting edge 6 has such a shape that the outlines of the shape before and after rotation of the insert by 120° around the insert center are coincident with each other.

The first surface 2 and the second surface 3 have the same shape. The phase of the first surface 2 and the phase of the second surface 3 are displaced from each other so that the second cutting edge 6b of the second surface 3 is located at a corner where the first cutting edge 6a of the first surface 2 is located.

Thus, the cutting insert 1 in the example is indexable so that the three cutting edges of each of the first surface 2 and the second surface 3 can be interchangeably used.

Moreover, by rotation of the cutting insert 1 by 180° around a line connecting the center of the corner edge 6c and the insert center, the cutting insert 1 is reversed in such a way that the outlines of the first surface 2 and the second surface 3 and the outline of the bottom surface 5a before and after the rotation are coincident with each other. Therefore, the condition for reversibility is also satisfied.

If the phase of the first surface 2 and the phase of the second surface 3 are displaced from each other in a state in which the recessed portion 5 is not present, the side surface 4 would be twisted, and the twisted side surface would be supported by a seat side surface of an insert support seat. Therefore, the shapes and machining of the side surface of the cutting insert and the insert support seat become complex, and the stability of the cutting insert supported by the insert support seat is likely to decrease.

In contrast, the cutting insert in the example has the recessed portion 5, so that the side surface 4 adjacent to the first surface 2 and the side surface 4 adjacent to the second surface 3 are separated from each other. Moreover, the bottom surface 5a of the recessed portion 5 is composed of untwisted flat surfaces, and the bottom surface is received by the seat side surface of the insert support seat. Therefore, machining does not become complex, and it is possible to increase the cramping precision the clamping stability of the cutting insert.

Figure 5:
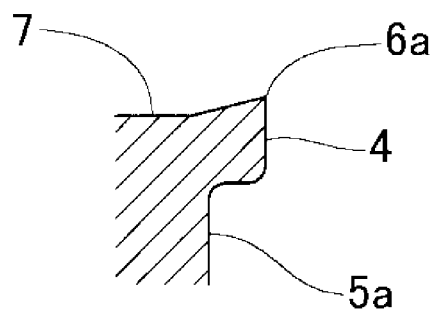
FIG. 5 is a partial sectional view taken along line I-I of FIG. 2.
Figure 6:
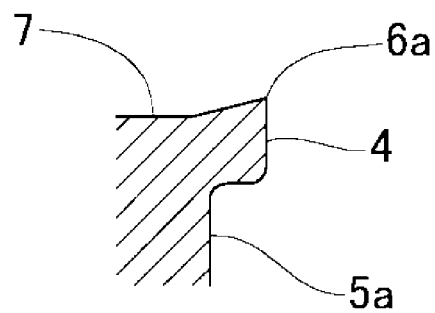
FIG. 6 is a partial sectional view taken along line II-II of FIG. 2.
Figure 7:
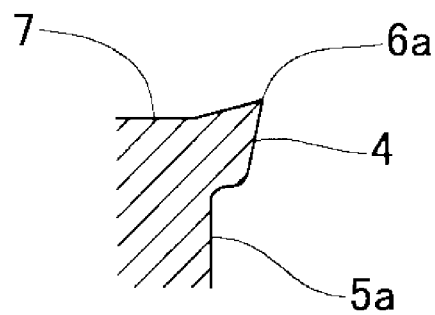
FIG. 7 is a partial sectional view of another embodiment taken along line II-II of FIG. 2.
Figure 8:
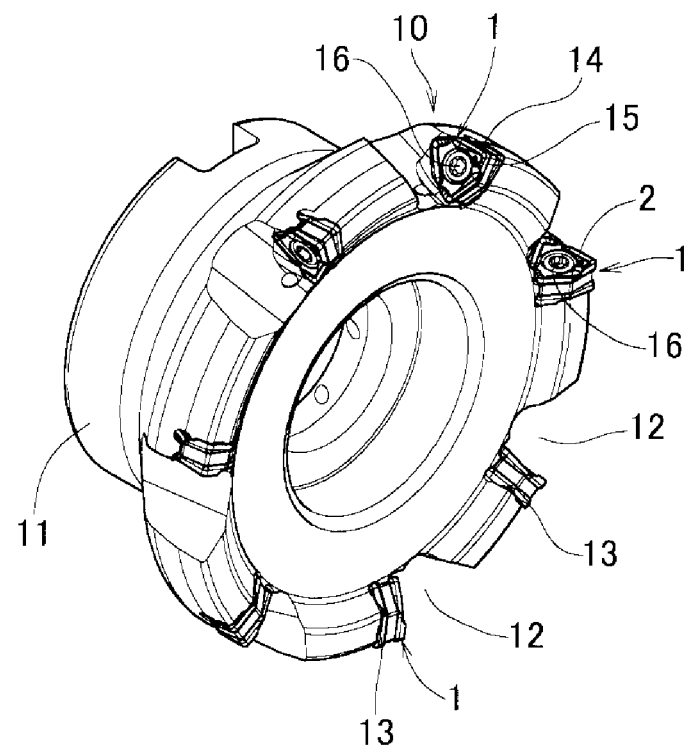
FIG. 8 is a perspective view illustrating an example of a milling cutter according to the present invention.
Figure 9:
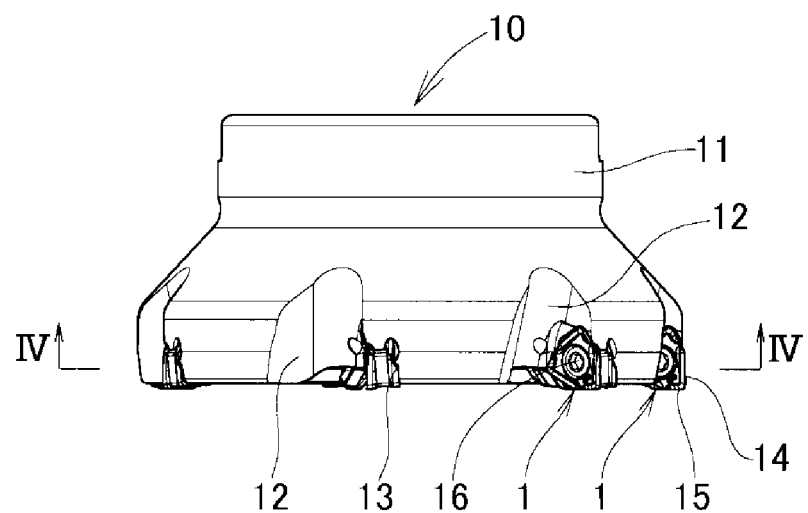
FIG. 9 is a side view of the milling cutter of FIG. 8.
Figure 10:
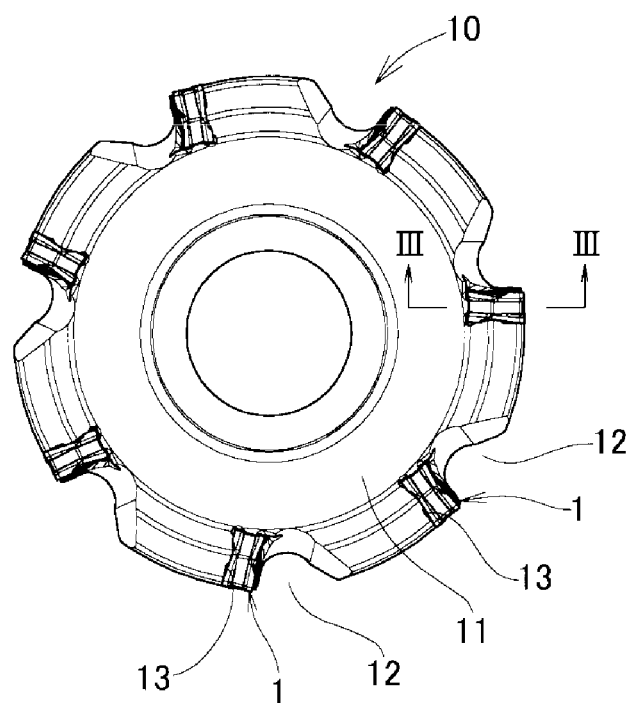
FIG. 10 is a front view of the milling cutter of FIG. 8.

As illustrated in FIGS. 5 and 6, regarding the side surface 4 that is continuous with the first cutting edge 6a, by forming a part of the side surface 4 adjacent to the corner edge 6c as a surface perpendicular to the bearing surface 7, it is possible to suppress decrease of the strength of the first cutting edge 6a.

By forming the side surface 4 adjacent to the first surface 2 and the side surface 4 adjacent to the second surface 3 as surfaces that are not to be supported by the insert support seat by separating them with the recessed portion 5 therebetween as described above, it becomes also possible to make the angle between the bearing surface 7 and a part of the side surface 4 adjacent to the corner edge 6c that forms the first cutting edge 6a be 90° as shown in FIG. 5 and to make the angle between the bearing surface 7 and a part of the side surface 4 away from the corner edge 6c (adjacent to an obtuse angle corner) be 90° or less.

When a corner portion that has been already used for machining is attached to the cutter body as a restraining surface side, because the bottom surface 5a used as a restraining surface and an edge side surface are separated from each other by the recessed portion 5, even when the corner portion has been worn, there is no negative effect on the contact portion with the restraining surface (wear of the side surface does not affect the bottom surface 5a). Thus, it is possible to increase the stability of attachment when multiple corners are used.

The side surface 4 serves as a flank face of a major cutting edge. By making a part of the side surface 4 adjacent to an obtuse angle corner as an inclined surface illustrated in FIG. 7 or a curved surface and making a part of the side surface 4 near the recessed portion 5 be located more inward than a part adjacent to the cutting edge, it is possible to provide a necessary clearance at the part adjacent to the obtuse angle corner, which is inevitably located closer to a workpiece than the part adjacent to the corner edge is. Thus, interference between a tool and a workpiece does not easily occur.

Figure 4:
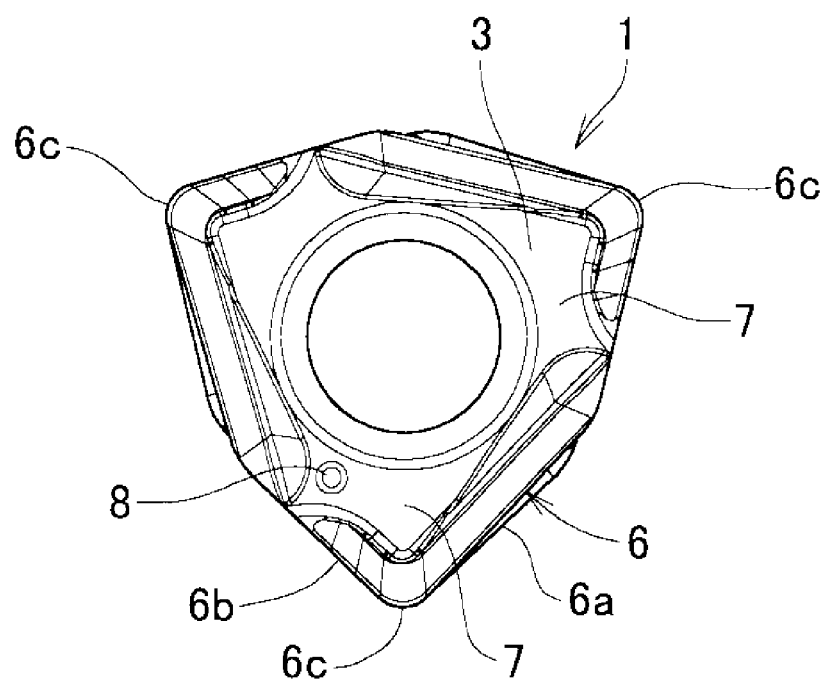
FIG. 4 is a bottom view of the cutting insert of FIG. 1.

In FIGS. 1, 2, and 4, identification marks 8 for differentiating between the first surface 2 and the second surface 3 are shown. It is possible to differentiate between the first surface 2 and the second surface 3 even if the identification mark 8 is formed on only one of these surfaces. The identification mark 8 is not essential, although preferably it is formed.

FIGS. 8 to 12 illustrate an example of a face milling cutter including the cutting insert 1.

In a face milling cutter 10 in the example, the cutting insert 1 is attached to a tool body (cutter body) 11 by using a clamp bolt 16.

On the outer periphery of the end portion of the tool body 11, chip pockets 12 and insert support seats 13, each facing a corresponding one of the chip pockets, are arranged in the circumferential direction.

Figure 11:
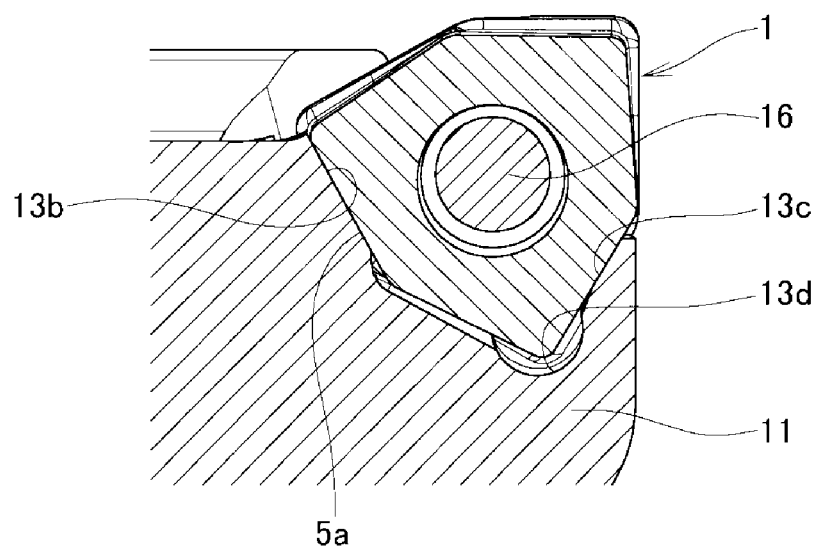
FIG. 11 is a partial sectional view taken along line of FIG. 10.
Figure 12:
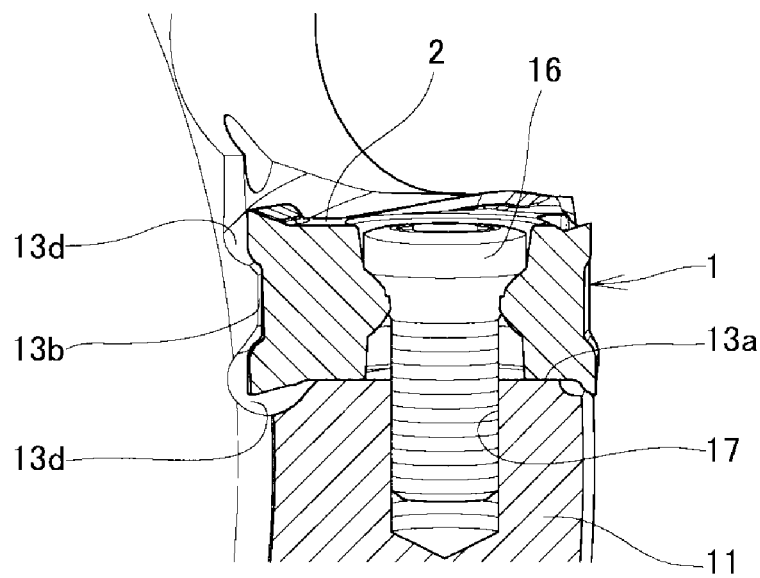
FIG. 12 is a partial sectional view taken along line Iv-Iv of FIG. 9.
Figure 13:
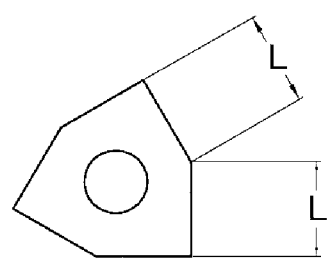
FIG. 13 is a plan view illustrating the basic shape of an existing reversible hexagonal cutting insert.

The insert support seat 13 has a major seat surface 13a (see FIG. 12) and two seat side surfaces 13b and 13c (see FIGS. 11 and 12). The major seat surface 13a has a screw hole 17, into which the clamp bolt 16 is to be screwed. FIG. 11 is an enlarged sectional view of FIG. 10 taken along showing a cross section of the recessed portion 5.

In FIGS. 11 and 12, a thinned portion 13d is illustrated. The thinned portion 13d is provided to avoid interference of a cutting edge located at a position at which the cutting edge does not contribute to cutting and to avoid stress concentration on a corner portion between the major seat surface and the seat side surface.

The cutting insert 1 is attached to the insert support seat 13 in such a direction that one of the first surface 2 and the second surface 3 (in the figures, the first surface 2) serves as a rake face, and the first cutting edge adjacent to the rake face serves as a major cutting edge 14 and the second cutting edge serves as a flat cutting edge 15 when face milling is performed.

The major seat surface 13a of the insert support seat supports a bearing surface formed in a surface opposite to the rake face (in the figures, the bearing surface 7 formed in the second surface 3). Moreover, the seat side surfaces 13b and 13c of the insert support seat support two flat surfaces of the bottom surface 5a of the recessed portion that form an angle of 90° or less.

With the face milling cutter 10 having such a structure, it is possible to provide a major cutting edge length that is the same as that of an existing milling cutter by using a cutting insert whose size is smaller than that of an existing cutting insert.

Therefore, it is possible to increase the rigidity of the tool body while decreasing the size of the insert support seat of the tool body, and it is possible to reduce the costs by reducing the material of the cutting insert.

The seat side surfaces 13b and 13c of the insert support seat 13 support the untwisted bottom surface 5a of the recessed portion 5, which is formed between the side surface that is continuous with the first surface 2 and the side surface that is continuous with the second surface 3. Therefore, the clamping precision of the cutting insert is increased. Moreover, the cutting insert is stably supported, and the clamping stability is increased.

The shape of a cutting insert according to the present invention is not limited to a hexagonal shape in the example. For example, when the corner edge has a chamfer instead of the nose R, each of the first surface and the second surface has nine angles. The cutting insert may have such a shape.

The shape of the bottom surface 5a of the recessed portion 5 need not be a hexagonal shape. The shape of the bottom surface 5a may be any shape as long as the outlines of the bottom surface before and after rotation of the insert by 120° around the insert center of the cutting edge are coincident with each other.

REFERENCE SIGNS LIST 1 cutting insert
2 first surface
3 second surface
4 side surface
5 recessed portion
5a bottom surface
6 cutting edge
6a first cutting edge
6b second cutting edge
6c corner edge
7 bearing surface
8 identification mark
10 face milling cutter
11 tool body
12 chip pocket
13 insert support seat
13a major seat surface
13b, 13c seat side surface
13d thinned portion
14 major cutting edge
15 flat cutting edge
16 clamp bolt
17 screw hole

The invention claimed is:

1. A cutting insert comprising: a first surface and a second surface each of which is polygonal and that face away from each other; a side surface that is continuous with the first surface and a side surface that is continuous with the second surface; a cutting edge formed along each of a ridge where the first surface and the side surface intersect and a ridge where the second surface and the side surface intersect; a bearing surface formed in each of a part the first surface and a part of the second surface adjacent to an insert center, the bearing surfaces disposed parallel to each other; and a recessed portion that separates the side surface that is continuous with the first surface from the side surface that is continuous with the second surface, wherein the cutting edge includes three corner edges, a first cutting edge, and a second cutting edge, the first and second cutting edges being continuous with each other and located between each pair of the corner edges, wherein a length of the first cutting edge is greater than that of the second cutting edge, an end portion of the first cutting edge adjacent to one of the corner edges is at a position higher than the bearing surface, and an end portion of the first cutting edge opposite to the end portion adjacent to the corner edge is at a position lower than the bearing surface, wherein each of the first surface, the second surface, and a cross section of the recessed portion has such a shape that outlines of the shape before and after rotation of the insert by 120° around the insert center are coincident with each other, wherein the first surface and the second surface have the same shape, and the second cutting edge of the second surface is located at a corner at which the first cutting edge of the first surface is located, and wherein, in the first cutting edge, an angle between the bearing surface and a part of the side surface adjacent to the corner edge is 90°, and an angle between the bearing surface and a part of the side surface away from the corner edge is 90° or less.

2. The cutting insert according to claim 1, wherein each of the first surface and the second surface has a hexagonal shape having acute angle corners, obtuse angle corners, long sides, and short sides; each of the corner edges is formed at a corresponding one of the acute angle corners; the first cutting edge is formed along each of the long sides; and the second cutting edge is formed along each of the short sides.

3. The cutting insert according to claim 1, wherein the cross section of the recessed portion has a hexagonal shape having six sides of equal length and corners at which acute angles and obtuse angles are alternately arranged.

4. A milling cutter comprising:
the cutting insert according to claim 1; and
a tool body including an insert support seat that is in contact with the cutting insert,
wherein the insert support seat has a major seat surface with which the bearing surface of the cutting insert is in contact and a seat side surface that is in contact with a bottom surface of the recessed portion of the cutting insert.

* * * * *